(12) United States Patent
Shveidel et al.

(10) Patent No.: US 12,164,771 B2
(45) Date of Patent: Dec. 10, 2024

(54) SYSTEM AND METHOD FOR MANAGING DATA PORTION OWNERSHIP IN A STORAGE CLUSTER

(71) Applicant: Dell Products L.P., Round Rock, TX (US)

(72) Inventors: Vladimir Shveidel, Pardes-Hana (IL); Nimrod Shani, Raanana (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/160,404

(22) Filed: Jan. 27, 2023

(65) Prior Publication Data

US 2024/0256128 A1 Aug. 1, 2024

(51) Int. Cl.
*G06F 3/06* (2006.01)

(52) U.S. Cl.
CPC ............ *G06F 3/061* (2013.01); *G06F 3/0644* (2013.01); *G06F 3/0659* (2013.01); *G06F 3/067* (2013.01)

(58) Field of Classification Search
CPC ...... G06F 3/061; G06F 3/0644; G06F 3/0659; G06F 3/067
USPC .......................................................... 711/154
See application file for complete search history.

(56) References Cited

U.S. PATENT DOCUMENTS

| | | | |
|---|---|---|---|
| 2017/0214737 A1* | 7/2017 | Agarwal | G06F 9/505 |
| 2021/0320975 A1* | 10/2021 | McCarthy | H04L 49/9078 |
| 2022/0019350 A1* | 1/2022 | Karr | G06F 3/0604 |
| 2022/0066944 A1* | 3/2022 | Hayes | H04L 41/02 |

* cited by examiner

*Primary Examiner* — Gautam Sain
*Assistant Examiner* — Wei Ma
(74) *Attorney, Agent, or Firm* — Brian J. Colandreo; Heath M. Sargeant; Holland & Knight LLP

(57) ABSTRACT

A method, computer program product, and computing system for dividing a logical address space into a first and at least a second set of data portions. Exclusive ownership of the first set may be assigned to a first storage node of a storage cluster. Exclusive ownership of the second set may be assigned to at least a second storage node of the storage cluster. One or more IO requests associated with one or more of the first set of data portions and the at least a second set of data portions may be processed without transferring data portions between the first the at least a second storage node based upon the exclusive ownership of the first set of data portions by the first storage node and the exclusive ownership of the at least a second set of data portions by the at least a second storage node.

14 Claims, 9 Drawing Sheets

SYSTEM AND METHOD FOR MANAGING DATA PORTION OWNERSHIP IN A STORAGE CLUSTER

BACKGROUND

Storing and safeguarding electronic content may be beneficial in modern business and elsewhere. Accordingly, various methodologies may be employed to protect and distribute such electronic content.

For example, consider a multi-node storage cluster where nodes are connected via a network link. Normally, both nodes serve IO requests, but if one node fails, the second storage node continues service, thus providing cluster high availability. The main challenge of this configuration is that both nodes generally should have access to the same metadata that maps from logical address (defined in IO) to a target data block. With conventional approaches, that means that the storage cluster should either enforce global/inter-node synchronization/locking mechanism, or engage asymmetric logical unit access (ALUA)-based approach (i.e., maintain volume ownership per node and configure the client multipath agent so that each IO request is always (or preferably) routed to the owner node).

The first option is very complex, has low reliability, and has a negative impact on cluster performance. The second, complicates cluster deployment and management for the client, and is unable to provide node load balancing. This means that the storage cluster suffers from overall performance degradation.

Summary of Disclosure

In one example implementation, a computer-implemented method executed on a computing device may include, but is not limited to, dividing a logical address space into a first set of data portions and at least a second set of data portions. Exclusive ownership of the first set of data portions may be assigned to a first storage node of a storage cluster. Exclusive ownership of the at least a second set of data portions may be assigned to at least a second storage node of the storage cluster. One or more IO requests associated with one or more of the first set of data portions and the at least a second set of data portions may be processed without transferring data portions between the first storage node and the at least a second storage node based upon, at least in part, the exclusive ownership of the first set of data portions by the first storage node and the exclusive ownership of the at least a second set of data portions by the at least a second storage node.

One or more of the following example features may be included. Non-exclusive ownership of one or more metadata objects associated with the first set of data portions and the at least a second set of data portions may be assigned based upon, at least in part, a type of IO request of the one or more IO requests. The one or more metadata objects associated with the first set of data portions and the at least a second set of data portions include one or more mapper metadata tree objects and one or more virtual layer blocks. Processing the one or more IO requests associated with one or more of the first set of data portions and the at least a second set of data portions may include: determining an exclusive ownership storage node associated with the one or more IO requests; and processing the IO request on the exclusive ownership storage node associated with the data portion without transferring data portions between the exclusive ownership storage node and the other storage nodes. Processing the IO request on the exclusive ownership storage node associated with the data portion may include processing an IO read request, wherein processing the IO read request may include: receiving the IO read request on the first storage node; determining that the exclusive ownership storage node associated with the data portion is a second storage node; sending a request to the second storage node to map the data portion to a virtual layer block; receiving a response from the second storage node with a virtual layer block address; and reading the data portion using the first storage node from a physical layer block associated with the virtual layer block address. Processing the IO request on the exclusive ownership storage node associated with the data portion may include processing an IO write request, wherein processing the IO write request may include: receiving the IO write request on the first storage node; determining that the exclusive owner node associated with the data portion is a second storage node; writing content for the data portion to a log memory system; sending a request to the second storage node with information concerning the IO write request; receiving a response from the second storage node acknowledging the IO write request; and sending an acknowledgement signal from the first storage node. Processing the IO request on the exclusive ownership storage node associated with the data portion may include flushing the data portion, wherein flushing the data portion may include: writing, from the first storage node, the data portion to a physical layer block; generating a virtual layer block corresponding to the physical layer block; updating a mapper metadata tree with information concerning the flushing of the data portion; sending a request to a second storage node with information concerning the flushing of the data portion; and receiving a response from the second storage node acknowledging the flushing of the data portion.

In another example implementation, a computer program product resides on a computer readable medium that has a plurality of instructions stored on it. When executed by a processor, the instructions cause the processor to perform operations that may include, but are not limited to, dividing a logical address space into a first set of data portions and at least a second set of data portions. Exclusive ownership of the first set of data portions may be assigned to a first storage node of a storage cluster. Exclusive ownership of the at least a second set of data portions may be assigned to at least a second storage node of the storage cluster. One or more IO requests associated with one or more of the first set of data portions and the at least a second set of data portions may be processed without transferring data portions between the first storage node and the at least a second storage node based upon, at least in part, the exclusive ownership of the first set of data portions by the first storage node and the exclusive ownership of the at least a second set of data portions by the at least a second storage node.

One or more of the following example features may be included. Non-exclusive ownership of one or more metadata objects associated with the first set of data portions and the at least a second set of data portions may be assigned based upon, at least in part, a type of IO request of the one or more IO requests. The one or more metadata objects associated with the first set of data portions and the at least a second set of data portions include one or more mapper metadata tree objects and one or more virtual layer blocks. Processing the one or more IO requests associated with one or more of the first set of data portions and the at least a second set of data portions may include: determining an exclusive ownership storage node associated with the one or more IO requests; and processing the IO request on the exclusive ownership storage node associated with the data portion without transferring data portions between the exclusive ownership storage node and the other storage nodes. Processing the IO request on the exclusive ownership storage node associated with the data portion may include processing an IO read request, wherein processing the IO read request may include: receiving the IO read request on the first storage node; determining that the exclusive ownership storage node associated with the data portion is a second storage node; sending a request to the second storage node to map the data portion to a virtual layer block; receiving a response from the second storage node with a virtual layer block address; and reading the data portion using the first storage node from a physical layer block associated with the virtual layer block address. Processing the IO request on the exclusive ownership storage node associated with the data portion may include processing an IO write request, wherein processing the IO write request may include: receiving the IO write request on the first storage node; determining that the exclusive owner node associated with the data portion is a second storage node; writing content for the data portion to a log memory system; sending a request to the second storage node with information concerning the IO write request; receiving a response from the second storage node acknowledging the IO write request; and sending an acknowledgement signal from the first storage node. Processing the IO request on the exclusive ownership storage node associated with the data portion may include flushing the data portion, wherein flushing the data portion may include: writing, from the first storage node, the data portion to a physical layer block; generating a virtual layer block corresponding to the physical layer block; updating a mapper metadata tree with information concerning the flushing of the data portion; sending a request to a second storage node with information concerning the flushing of the data portion; and receiving a response from the second storage node acknowledging the flushing of the data portion.

In another example implementation, a computing system includes at least one processor and at least one memory architecture coupled with the at least one processor, wherein the at least one processor is configured to divide a logical address space into a first set of data portions and at least a second set of data portions. Exclusive ownership of the first set of data portions may be assigned to a first storage node of a storage cluster. Exclusive ownership of the at least a second set of data portions may be assigned to at least a second storage node of the storage cluster. One or more IO requests associated with one or more of the first set of data portions and the at least a second set of data portions may be processed without transferring data portions between the first storage node and the at least a second storage node based upon, at least in part, the exclusive ownership of the first set of data portions by the first storage node and the exclusive ownership of the at least a second set of data portions by the at least a second storage node.

One or more of the following example features may be included. Non-exclusive ownership of one or more metadata objects associated with the first set of data portions and the at least a second set of data portions may be assigned based upon, at least in part, a type of IO request of the one or more IO requests. The one or more metadata objects associated with the first set of data portions and the at least a second set of data portions include one or more mapper metadata tree objects and one or more virtual layer blocks. Processing the one or more IO requests associated with one or more of the first set of data portions and the at least a second set of data portions may include: determining an exclusive ownership storage node associated with the one or more IO requests; and processing the IO request on the exclusive ownership storage node associated with the data portion without transferring data portions between the exclusive ownership storage node and the other storage nodes. Processing the IO request on the exclusive ownership storage node associated with the data portion may include processing an IO read request, wherein processing the IO read request may include: receiving the IO read request on the first storage node; determining that the exclusive ownership storage node associated with the data portion is a second storage node; sending a request to the second storage node to map the data portion to a virtual layer block; receiving a response from the second storage node with a virtual layer block address; and reading the data portion using the first storage node from a physical layer block associated with the virtual layer block address. Processing the IO request on the exclusive ownership storage node associated with the data portion may include processing an IO write request, wherein processing the IO write request may include: receiving the IO write request on the first storage node; determining that the exclusive owner node associated with the data portion is a second storage node; writing content for the data portion to a log memory system; sending a request to the second storage node with information concerning the IO write request; receiving a response from the second storage node acknowledging the IO write request; and sending an acknowledgement signal from the first storage node. Processing the IO request on the exclusive ownership storage node associated with the data portion may include flushing the data portion, wherein flushing the data portion may include: writing, from the first storage node, the data portion to a physical layer block; generating a virtual layer block corresponding to the physical layer block; updating a mapper metadata tree with information concerning the flushing of the data portion; sending a request to a second storage node with information concerning the flushing of the data portion; and receiving a response from the second storage node acknowledging the flushing of the data portion.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

DETAILED DESCRIPTION

Figure 1:
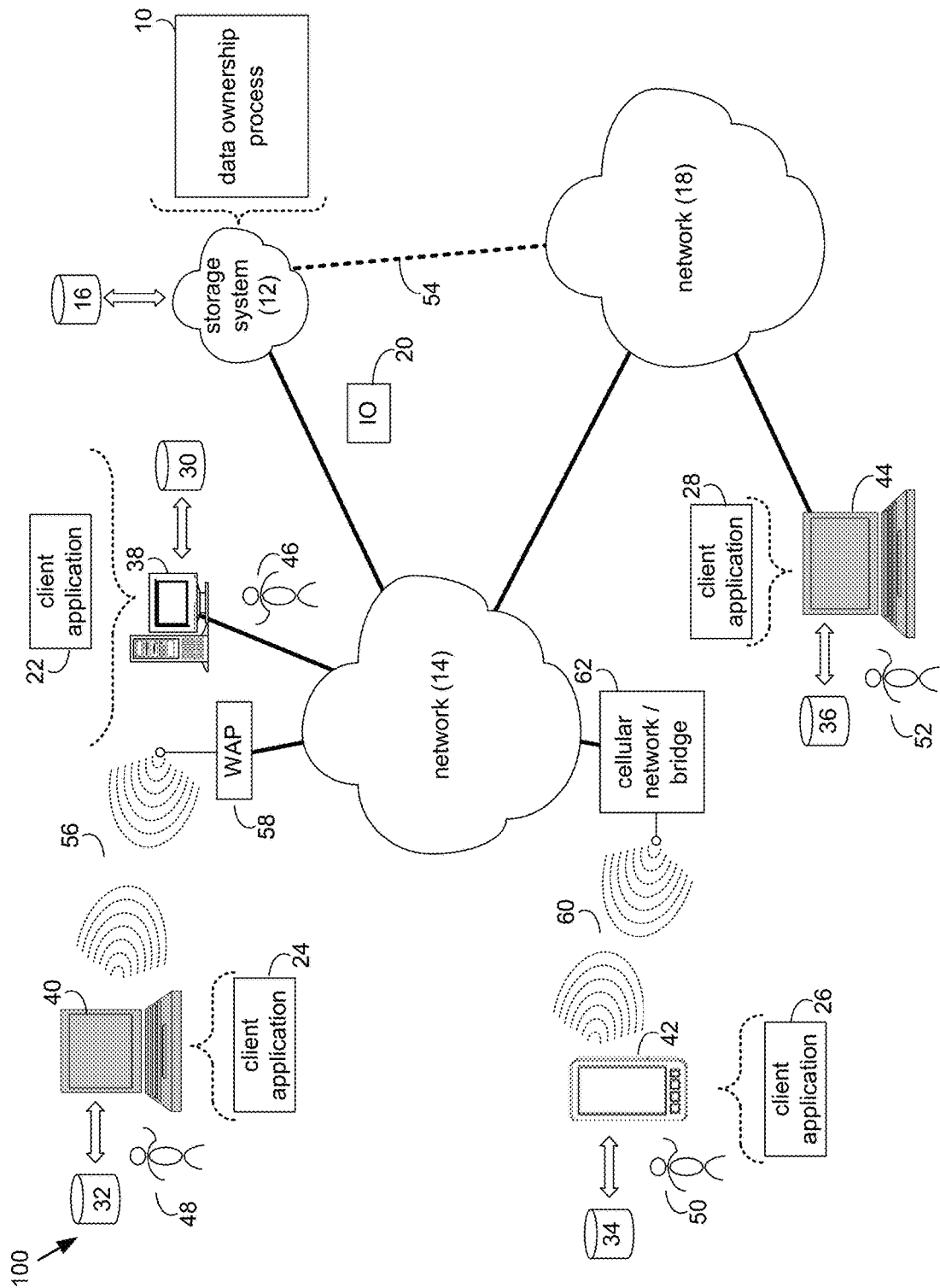
FIG. 1 is an example diagrammatic view of a storage system and a data ownership process coupled to a distributed computing network according to one or more example implementations of the disclosure.

System Overview:

Referring to FIG. 1, there is shown data ownership process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of data ownership process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of data ownership process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a data ownership process, such as data ownership process 10 of FIG. 1, may include but is not limited to, dividing a logical address space into a first set of data portions and at least a second set of data portions. Exclusive ownership of the first set of data portions may be assigned to a first storage node of a storage cluster. Exclusive ownership of the at least a second set of data portions may be assigned to at least a second storage node of the storage cluster. One or more IO requests associated with one or more of the first set of data portions and the at least a second set of data portions may be processed without transferring data portions between the first storage node and the at least a second storage node based upon, at least in part, the exclusive ownership of the first set of data portions by the first storage node and the exclusive ownership of the at least a second set of data portions by the at least a second storage node.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
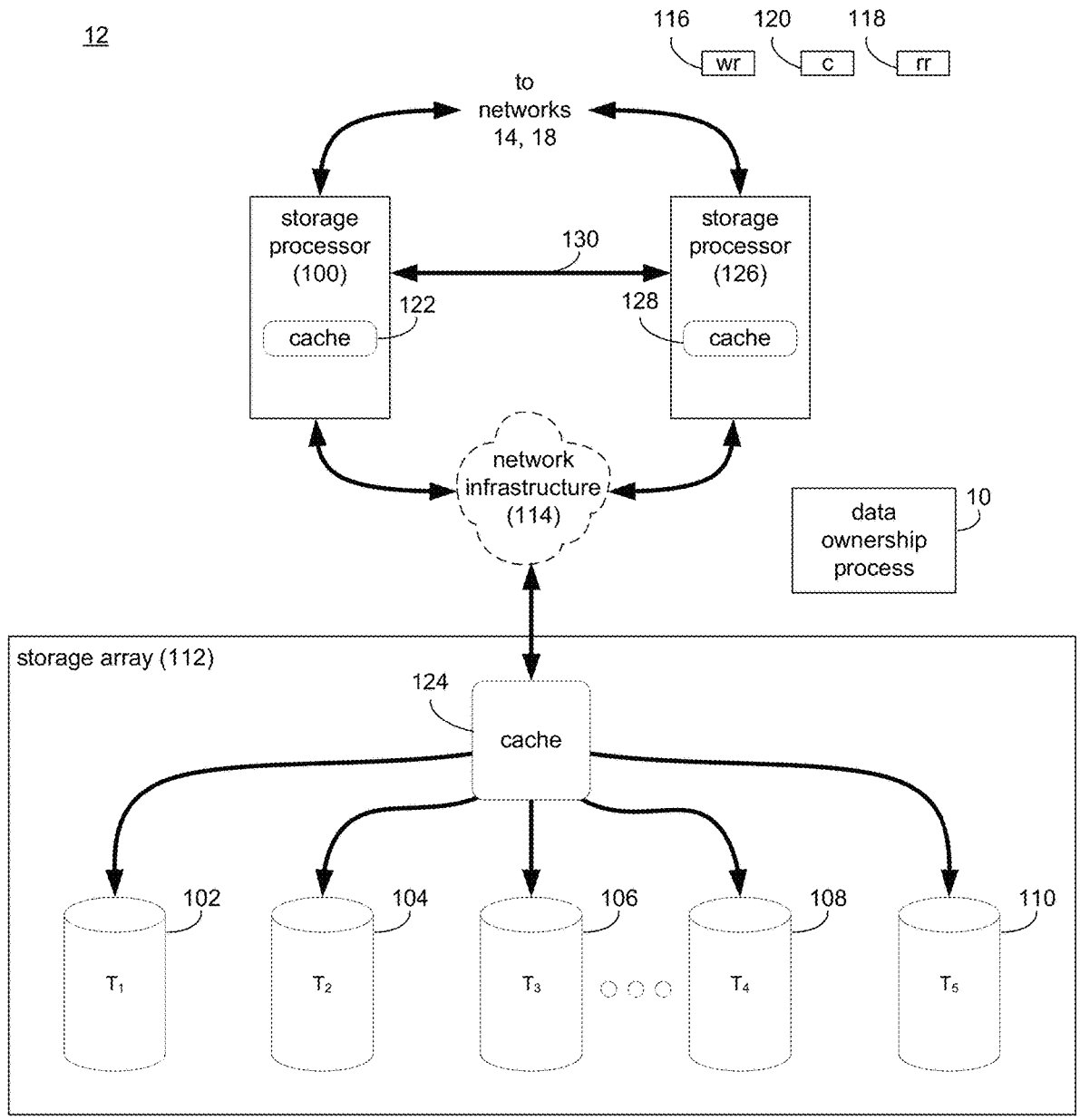
FIGS. 2-3 are example diagrammatic views of the storage system of FIG. 1 according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of data ownership process 10. The instruction sets and subroutines of data ownership process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of data ownership process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of data ownership process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of data ownership process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

In some implementations, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes (e.g., storage processors 100, 126), both actively running the same kind of service(s) simultaneously. One purpose of an active-active cluster may be to achieve load balancing. Load balancing may distribute workloads across all nodes in order to prevent any single node from getting overloaded. Because there are more nodes available to serve, there will also be a marked improvement in throughput and response times. Another purpose of an active-active cluster may be to provide at least one active node in the event that one of the nodes in the active-active cluster fails.

In some implementations, storage processor 126 may function like storage processor 100. For example, during operation of storage processor 126, content 118 to be written to storage system 12 may be processed by storage processor 126. Additionally/alternatively and when storage processor 126 is configured as an application server, content 118 to be written to storage system 12 may be internally generated by storage processor 126.

Storage processor 126 may include frontend cache memory system 128. Examples of frontend cache memory system 128 may include but are not limited to a volatile, solid-state, cache memory system (e.g., a dynamic RAM cache memory system) and/or a non-volatile, solid-state, cache memory system (e.g., a flash-based, cache memory system).

Storage processor 126 may initially store content 118 within frontend cache memory system 126. Depending upon the manner in which frontend cache memory system 128 is configured, storage processor 126 may immediately write content 118 to data array 112 (if frontend cache memory system 128 is configured as a write-through cache) or may subsequently write content 118 to data array 112 (if frontend cache memory system 128 is configured as a write-back cache).

In some implementations, the instruction sets and subroutines of data ownership process 10, which may be stored on storage device 16 included within storage system 12, may be executed by one or more processors (not shown) and one or more memory architectures (not shown) included within storage system 12. Accordingly, in addition to being executed on storage processor 126, some or all of the instruction sets and subroutines of data ownership process 10 may be executed by one or more processors (not shown) and one or more memory architectures (not shown) included within data array 112.

Further and as discussed above, during the operation of data array 112, content (e.g., content 118) to be written to data array 112 may be received from storage processor 126 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

As discussed above, storage processor 100 and storage processor 126 may be configured in an active/active configuration where processing of data by one storage processor may be synchronized to the other storage processor. For example, data may be synchronized between each storage processor via a separate link or connection (e.g., connection 130).

Metadata Architecture:

In the context of storage systems, metadata may generally include useful internal information managed by a storage array to describe and locate user data. All modern arrays abstract the physical media and present logical (virtualized) addresses to clients in the form of LUNs. The mapping between the logical address and physical address is a form of metadata that the array needs to manage. That is typically the most common form of metadata for SAN storage systems. Newer architectures manage additional metadata to implement additional capabilities. For example, snapshots, change tracking for efficient remote replication, deduplication pointers, and compression all involve managing some form of metadata.

The classic metadata structure of traditional storage systems directly links a Logical Address of a Block to the Physical Location of the Block. In this metadata structure, every logical block written, has a physical block linked directly to it. In addition, as most traditional storage systems were architected for a spinning disk storage medium optimized for sequential writes the address of the logical address affects the physical location that the data is stored. This can lead to an unbalanced storage array that can suffer from hot-spots as specific address space ranges may experience more performance/input-output operations per second (IOPs) than other address space ranges.

Embodiments of the present disclosure may support a flash/random access medium. For example, embodiments of the present disclosure may include a metadata structure that completely decouples the Logical Block Address space address from the physical one. This is done by leveraging a multi-layer architecture.

Figure 3:
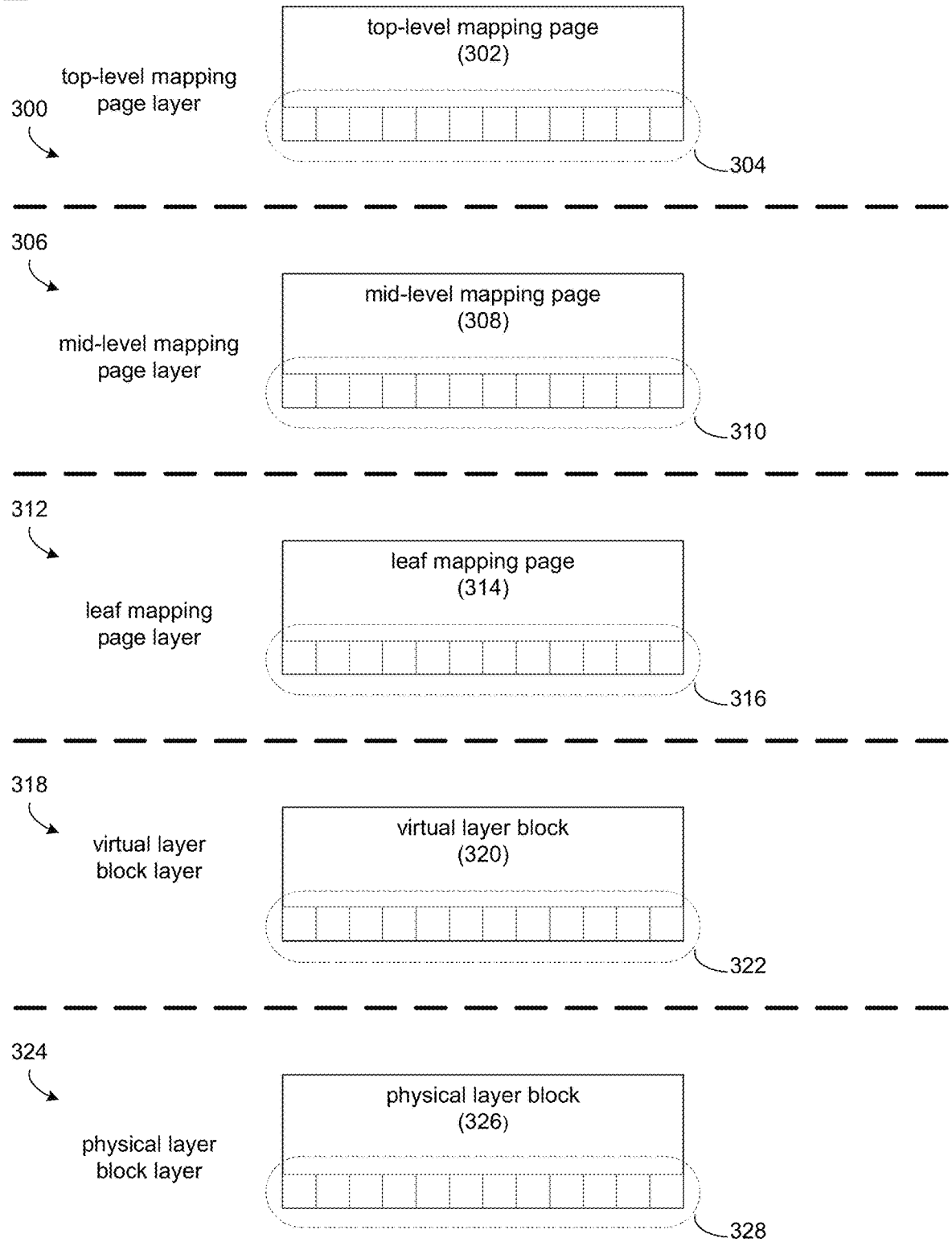
Figure 4A:
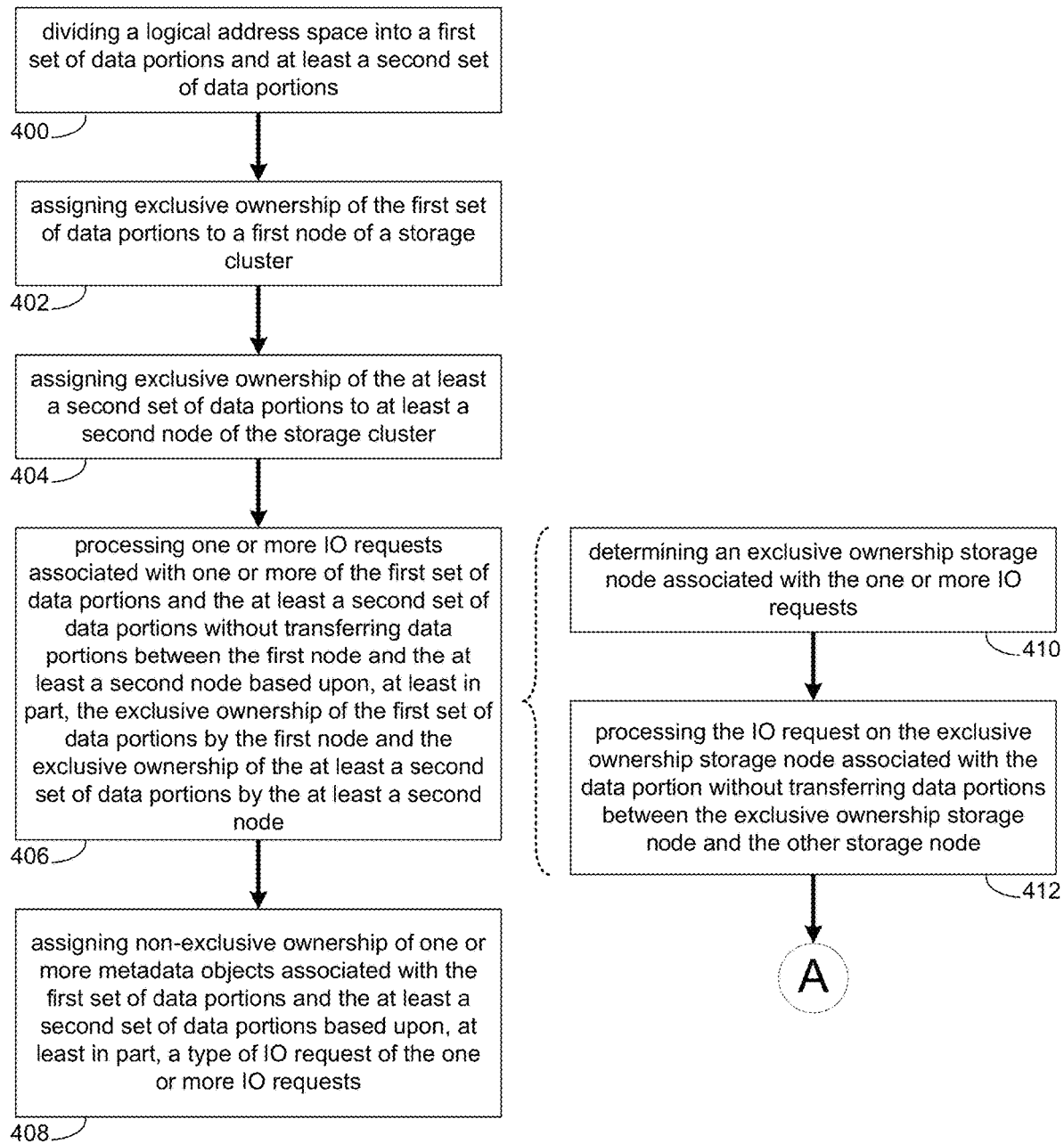
FIGS. 4A-4B are example flowcharts of the data ownership process of FIG. 1 according to one or more example implementations of the disclosure.
Figure 4B:
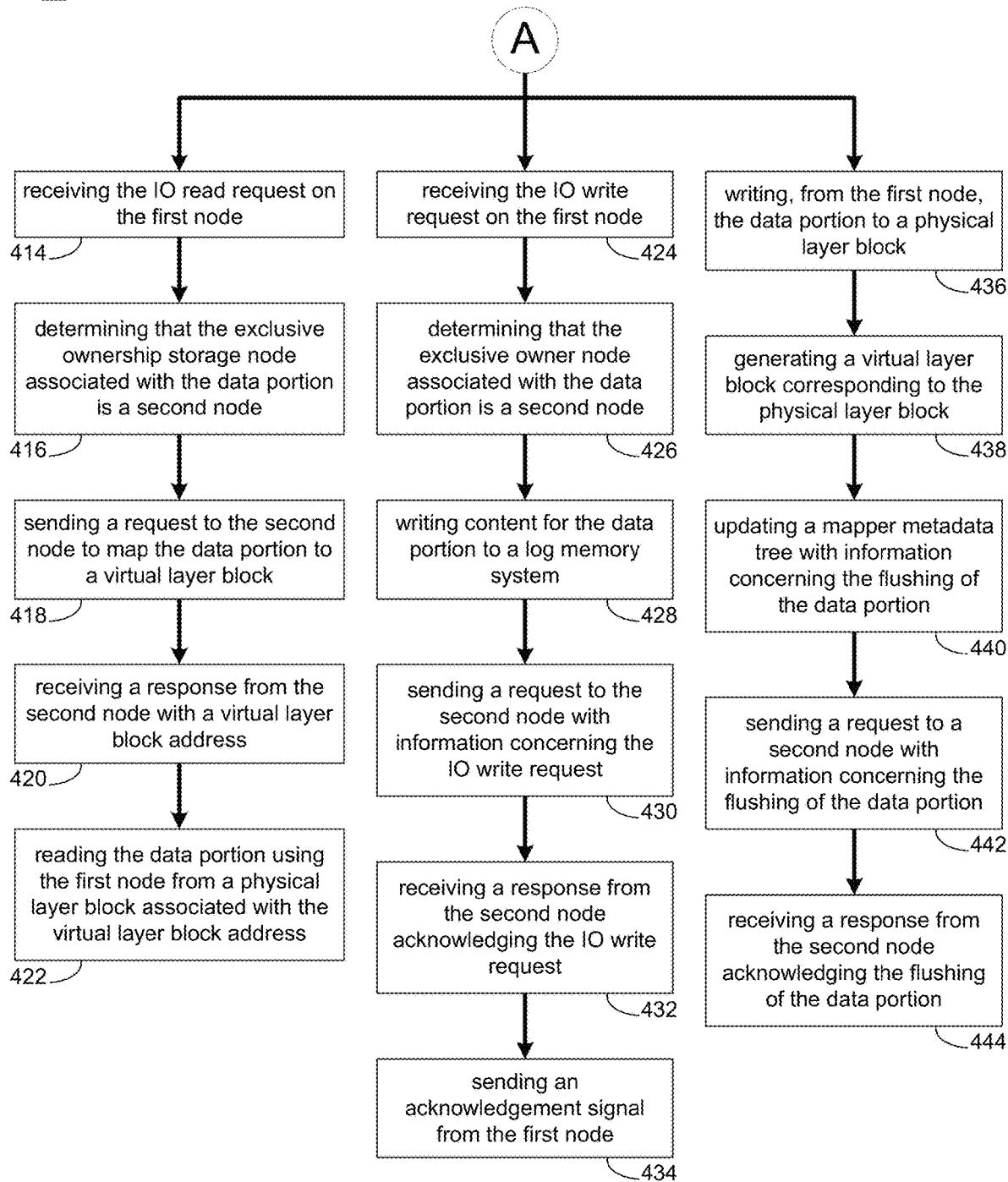

Referring also to FIG. 3, a storage system may generally include a mapper layer which is structured as a file system with various layers of pages and blocks. In some implementations, the combination of various metadata layers mapper layers may be referred to as a mapper metadata tree. While the following example includes metadata "blocks", it will be appreciated that other units of data storage may be used within the scope of the present disclosure. In some implementations, a top-level mapping page layer (e.g., top-level mapping page layer 300) may include top-level mapping page pages (e.g., top-level mapping page 302) with a plurality of entries (e.g., plurality of entries 304) that map or point to a plurality of entries of one or more mid-level mapping pages. A mid-level mapping page layer (e.g., mid-level mapping page layer 306) may include mid-level mapping page pages (e.g., mid-level mapping page 308) with a plurality of entries (e.g., plurality of entries 310) that map or point to a plurality of entries of one or more leaf mapping pages. A leaf mapping page layer (e.g., leaf mapping page layer 312) may include leaf mapping page pages (e.g., leaf mapping page 314) with a plurality of entries (e.g., plurality of entries 316) that map or point to a plurality of entries of one or more virtual layer blocks. Leaf mapping page layer 312 may represent various ranges of Logical Block Addresses (LBAs). For example, each entry of the plurality of entries (e.g., plurality of entries 316) of the leaf mapping page (e.g., leaf mapping page 314) may be associated with a LBA range. In some implementations, the combination of top-level mapping page layer 300, mid-level mapping page layer 306, and leaf mapping page layer 312 may be organized in a "tree" data structure where each leaf mapping page is a "leaf" of the "tree" data structure that corresponds to a specific LBA range. Accordingly, each leaf mapping page (e.g., leaf mapping page 314) may hold mapping of a LBA to a virtual layer block. It will be appreciated that other data structures may be used within the scope of the present disclosure to organize the first layer.

In some implementations, a virtual layer block layer (e.g., second layer 318) may include virtual layer blocks (e.g., virtual layer block 320) with a plurality of entries (e.g., plurality of entries 322) that map to a plurality of entries of one or more physical data blocks. The virtual layer block layer (e.g., virtual layer block layer 318) may generally isolate the logical address of a block from the physical location of the block. For example, a virtual layer block (e.g., virtual layer block 308) may encapsulate the physical location of user data and allow relocation without updating leaf mapping pages (e.g., leaf mapping page 314). Accordingly, the virtual layer block layer (e.g., virtual layer block layer 318) may decouple the Logical Block Address space address from the physical one.

In some implementations, a physical data block layer (e.g., physical data block layer 324) may include physical data blocks (e.g., physical data block 326) with a plurality of entries or portions (e.g., plurality of entries 328) that are configured to store user data. In this manner, physical data block layer 324 may describe the physical location of user data in a storage system. In some implementations, each physical data block (e.g., physical data block 326) may have a predefined amount of storage capacity for storing data (e.g., user data).

The Data Ownership Process:

Referring also to FIGS. 4A-8 and in some implementations, data ownership process 10 may divide 400 a logical address space into a first set of data portions and at least a second set of data portions. Exclusive ownership of the first set of data portions may be assigned 402 to a first storage node of a storage cluster. Exclusive ownership of the at least a second set of data portions may be assigned 404 to at least a second storage node of the storage cluster. One or more IO requests associated with one or more of the first set of data portions and the at least a second set of data portions may be processed 406 without transferring data portions between the first storage node and the at least a second storage node based upon, at least in part, the exclusive ownership of the first set of data portions by the first storage node and the exclusive ownership of the at least a second set of data portions by the at least a second storage node.

In some implementations, data ownership process 10 may allow for management of data portions in a storage cluster without requiring global or cross-storage cluster locking mechanisms. For example, consider a multi-node storage cluster where nodes are connected via a network link. Normally, both nodes serve IO requests, but if one node fails, the second storage node continues service, thus providing cluster high availability. The main challenge of this configuration is that both nodes generally should have access to the same metadata that maps from logical address (defined in IO) to a target data block. With conventional approaches, the storage cluster should either enforce global/internode synchronization/locking mechanism, or engage asymmetric logical unit access (ALUA)-based approach (i.e., maintain volume ownership per node and configure the client multipath agent so that each IO request is always (or preferably) routed to the owner node).

The first option is very complex, has low reliability, and has a negative impact on storage cluster performance. The second, complicates storage cluster deployment and management for the client, and is unable to provide node load balancing. This means that the storage cluster suffers from overall performance degradation. As will be discussed in greater detail below, implementations of the present disclosure may provide exclusive or "strong" ownership of particular data portions to specific nodes in the storage cluster; provide non-exclusive or "weak" ownership for metadata objects associated with the data portions; and manage the processing of IO requests received on each storage node without transferring data portions between the storage nodes.

Figure 5:
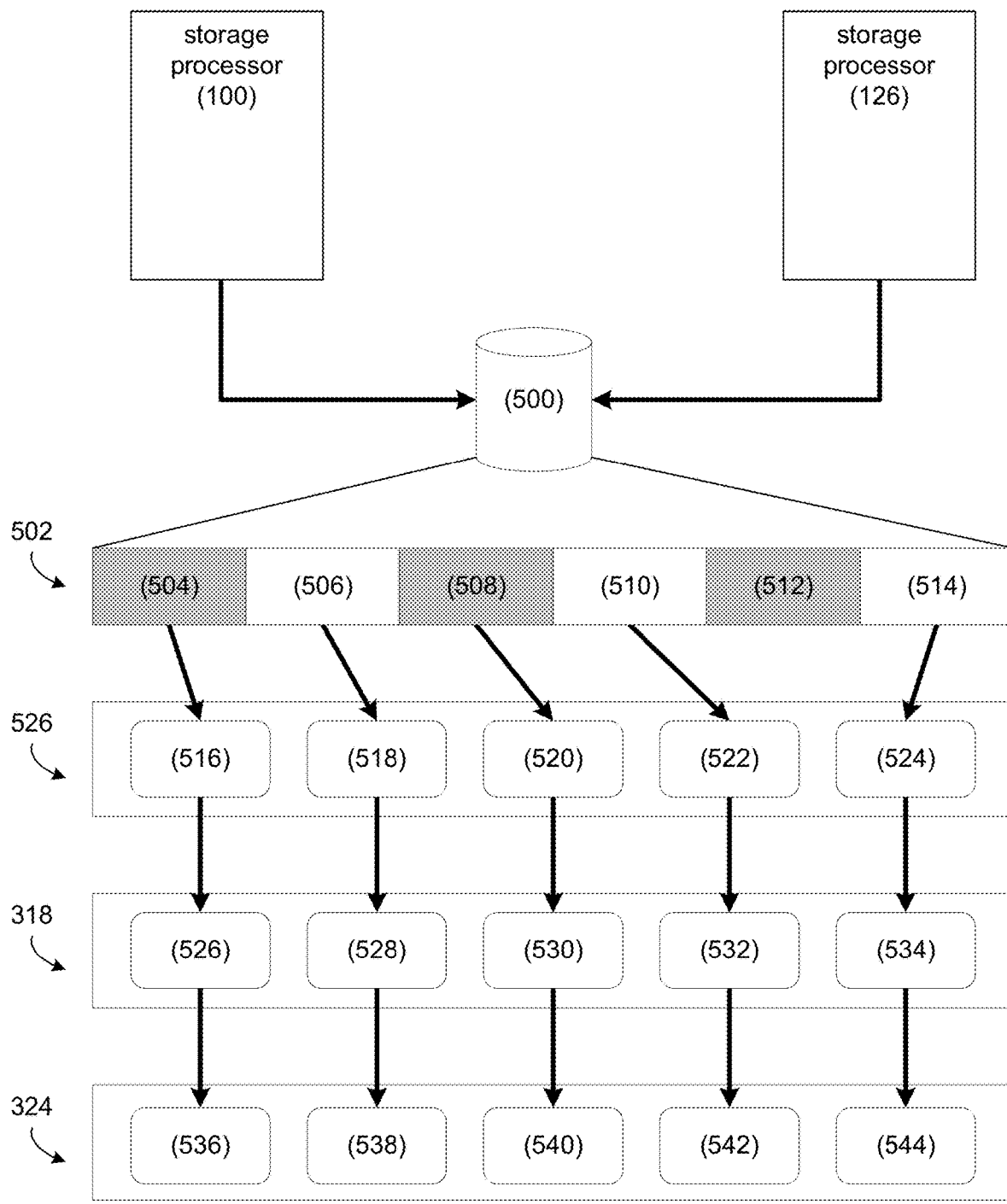
FIG. 5 is an example diagrammatic view of the storage system of FIG. 1 according to one or more example implementations of the disclosure.

In some implementations, data ownership process 10 may divide 400 a logical address space into a first set of data portions and at least a second set of data portions. For example, storage system 12 may include a plurality of storage objects configured to store user data (i.e., data stored by and accessed by users of storage system 12). Storage objects may generally include any container or storage unit configured to store data within a storage system (e.g., storage system 12). For example, a storage object may be any one of the following: a volume (aka Logical Unit Number (LUN)), a file, or parts thereof that may be defined e.g. by offsets or address ranges (e.g., sub-LUNs, disk extents, and/or slices). Referring also to FIG. 5 and in some implementations, storage system 12 may include a plurality of storage objects (e.g., storage object 500) that is accessible to both storage nodes of the storage cluster (e.g., storage nodes 100, 126). In this example, storage object 500 may include a plurality of logical data portions represented by logical address space (e.g., logical address space 502). Logical address space is an abstracted, logical representation of storage space within the storage system.

For example, suppose storage object 500 is a volume or slice with a predefined amount of storage space. Storage object 500 may be organized or defined by a total amount of logical address space 502 where various portions of the logical address space may be separately addressable. For example and in some implementations, logical address space 502 may include a plurality of data portions (e.g., data portions 504, 506, 508, 510, 512, 514). Each data portion may include a predefined amount of storage capacity (e.g., two megabytes). For example, data portion 504 may include a capacity of e.g., two megabytes with a logical address of 0 megabytes to two megabytes. Similarly, data portion 504 may include two megabytes of logical address space with a logical address of 2 megabytes to four megabytes. In this manner, each of data portions 504, 506, 508, 510, 512, 514 may be separately accessible. In some implementations, each data portion may be referred to as a "UXLA" or user data logical address where each data portion is defined by the combination of a storage object identifier and an address offset for the data portion within the storage object. For example, data portion 504 may include a UXLA defined by an identifier (e.g., name or assigned number) for storage object 500 and the offset within storage object 500 representing the logical address space that data portion 504 defines.

In some implementations, data ownership process 10 may divide 400 logical address space 502 into a first set of data portions (e.g., data portions 504, 508, 512 (shown in FIG. 5 with shading)) and at least a second set of data portions (e.g., data portions 506, 510, 514 (shown in FIG. 5 without shading)). As will be discussed in greater detail below, each set of data portions may correspond to a particular storage node within the storage cluster. In some implementations, dividing 400 logical address space 502 into two sets may include defining or receiving a data portion size and/or a total amount of data portions for each set. In one example, data ownership process 10 may divide logical address space 502 equally into the two sets of data portions. In another example, data ownership process 10 may divide logical address space 502 unequally into the two sets of data portions (i.e., where one set of data portions has more or fewer data portions). In some implementations, the amount of logical address space for each data portion may be equal for each set of data portions. For example and as shown in FIG. 5, even logical address spaces are divided into the first set of data portions while odd logical address spaces are divided into the second set of data portions. However, data ownership process 10 may divide 400 logical address space 502 into any number of sets of data portions (i.e., at least a second data portion) for any number of storage nodes in the storage cluster. For example, for three storage nodes, data ownership process 10 may divide 400 logical address space 502 into three set of data portions. As such, it will be appreciated that any number of sets of data portions may be defined by dividing 400 logical address space 502 for any corresponding number of storage nodes in the storage cluster.

In some implementations, data ownership process 10 may assign 402 exclusive ownership of the first set of data portions to a first storage node of a storage cluster. Exclusive ownership may generally include a strong ownership or include the exclusive locking of data portions by a particular storage node within the first set of data portions that is not shared with other storage nodes. In this manner, a storage node assigned with exclusive ownership over a data portion may not yield access to that data portion to another storage node. Referring again to FIG. 5, data ownership process 10 may assign 402 exclusive ownership of the first set of data portions (e.g., data portions 504, 508, 512) to storage node 100. In some implementations, data ownership process 10 may maintain a listing of exclusive ownership assignments for each data portion. In another example, the assignment may be derivable from the data portion itself. For example, data ownership process 10 may assign all even addressed data portions to one storage node. In this example, data ownership process 10 may determine which storage node has exclusive ownership over a particular data portion by determining whether the address of the data portion is odd or even.

In some implementations, data ownership process 10 may assign 404 exclusive ownership of the at least a second set of data portions to at least a second storage node of the storage cluster. Referring again to FIG. 5, data ownership process 10 may assign 404 exclusive ownership of the second set of data portions (e.g., data portions 506, 510, 514) to storage node 126. In some implementations, the assigning of exclusive ownership of the second set of data portions may similarly be derivable from the data portion itself. For example, data ownership process 10 may assign all odd addressed data portions to one storage node. In this example, data ownership process 10 may determine which storage node has exclusive ownership over a particular data portion by determining whether the address of the data portion is odd or even. As noted above, the storage cluster may include any number of storage nodes and any number of corresponding sets of data portions within the scope of the present disclosure.

In some implementations, data ownership process 10 may assign 408 non-exclusive ownership of one or more metadata objects associated with the first set of data portions and the at least a second set of data portions based upon, at least in part, a type of IO request of the one or more IO requests. A non-exclusive ownership assignment may generally include a "weak" ownership assignment that may be shared by each storage node in the storage cluster. For example, data ownership process 10 may allow metadata objects that reference each set of data portions to be shared or assigned to a particular storage node with a non-exclusive ownership based upon, at least in part, a type of IO request being processed or other operation being performed on the metadata object.

In some implementations, the one or more metadata objects associated with the first set of data portions and the at least a second set of data portions may include one or more mapper metadata tree objects and one or more virtual layer blocks. For example, a metadata object may generally include a non-physical data container that is used to map the data portions to other non-physical data containers or physical data containers or blocks. As discussed above concerning FIG. 3, data ownership process 10 may use various layers of metadata objects to abstract physical blocks or other portions of physical storage space into various logical representations for various purposes. For example, the one or more metadata objects may include mapper metadata tree objects such as top-level mapping page 302, mid-level mapping page 308, leaf mapping page 314, and/or virtual layer block 320.

Referring again to FIG. 5, each data portion of logical address space 502 may map to or be associated with one or more metadata objects. For example, data portion 504 may map to or be associated with a combination of top-level mapping pages, mid-level mapping pages, and/or leaf mapping pages represented in FIG. 5 by mapper metadata tree objects 516, 518, 520, 522, 524 of mapper metadata tree 526. Similarly, data portion 504 may map to mapper metadata tree object 516; data portion 506 may map to mapper metadata tree object 518; data portion 508 may map to mapper metadata tree object 520; data portion 510 may map to mapper metadata tree object 522; and data portion 514 may map to mapper metadata tree object 524. In some implementations, each storage node may maintain its own mapper tree.

As will be described in greater detail below, mapper metadata tree object 516 may map to virtual layer block 526; mapper metadata tree object 518 may map to virtual layer block 528; mapper metadata tree object 520 may map to virtual layer block 530; mapper metadata tree object 522 may map to virtual layer block 532; and mapper metadata tree object 524 may map to virtual layer block 534. Additionally, virtual layer block 526 may map to or point to physical layer block 536; virtual layer block 528 may map to or point to physical layer block 538; virtual layer block 530 may map to or point to physical layer block 540; virtual layer block 532 may map to or point to physical layer block 542; and virtual layer block 534 may map to or point to physical layer block 544.

In some implementations, data ownership process 10 may assign 408 non-exclusive or weak ownership for the top-level mapping pages, mid-level mapping pages, leaf mapping pages, and/or virtual layer blocks based upon, at least in part, the type of IO request or other operation being performed. For example and as discussed above certain mapper tree objects may be associated with data portions assigned to a particular storage node with exclusive ownership. Accordingly, data ownership process 10 may assign non-exclusive ownership to storage nodes for these metadata objects depending upon the type of IO request. For example, for IO requests that read or provide updates to top-level mapping pages, mid-level mapping pages, leaf mapping pages, data ownership process 10 may assign non-exclusive ownership to the storage node for the mapper metadata tree objects that correspond to a data portion assigned to that storage node. In some implementations, non-exclusive ownership may be implemented with local locks on the mapper metadata tree objects during the processing of the read and/or update request. In another example, suppose an IO request includes reading, incrementing a reference count, or decrementing a reference count of a virtual layer block. In these examples, each storage node may be assigned non-exclusive ownership to these virtual layer blocks using local locks during processing. Accordingly, it will be appreciated that with exclusive ownership assigned to storage nodes for particular data portions and non-exclusive ownership assigned to storage nodes for particular mapper metadata tree objects and/or virtual layer blocks, data ownership process 10 may avoid global locks and the associated processing required to synchronize access to data portions, mapper metadata tree objects, and/or virtual layer blocks.

In some implementations, data ownership process 10 may process 406 one or more IO requests associated with one or more of the first set of data portions and the at least a second set of data portions without transferring data portions between the first storage node and the at least a second storage node based upon, at least in part, the exclusive ownership of the first set of data portions by the first storage node and the exclusive ownership of the at least a second set of data portions by the at least a second storage node. For example, when an IO request or other operation is received by or performed on the storage node that is owner of all the involved data portions (e.g., exclusive ownership assignment) and metadata objects, all the processing is done locally under local locks for the data portions and associated metadata objects. As such, no peer synchronization is required.

In another example, when an IO request is received by a storage node that is not owner of the corresponding data portion or some flow (flush, background operation, etc.) requires updating of metadata objects not owned by the storage node, data ownership process 10 may process 406 these IO requests without transferring data portions between the first storage node and the second storage node based upon, at least in part, the exclusive ownership of the first set of data portions by the first storage node and the exclusive ownership of the second set of data portions by the second storage node.

In some implementations, processing 406 the one or more IO requests associated with one or more of the first set of data portions and the at least a second set of data portions may include determining 410 an exclusive ownership storage node associated with the one or more IO requests; and processing 412 the IO request on the exclusive ownership storage node associated with the data portion without transferring data portions between the exclusive ownership storage node and the other ownership node(s). For example, with each IO request and/or other operation to be performed on data portions within the storage system, data ownership process 10 may determine 410 an "exclusive ownership node" (i.e., storage node that has been assigned exclusive ownership) for the relevant data portion(s). As will be discussed in greater detail below, data ownership process 10 may process 412 the one or more IO requests received at storage node without exclusive ownership of the relevant data portions without transferring the data portions between the exclusive ownership storage node and the other node.

Figure 6:
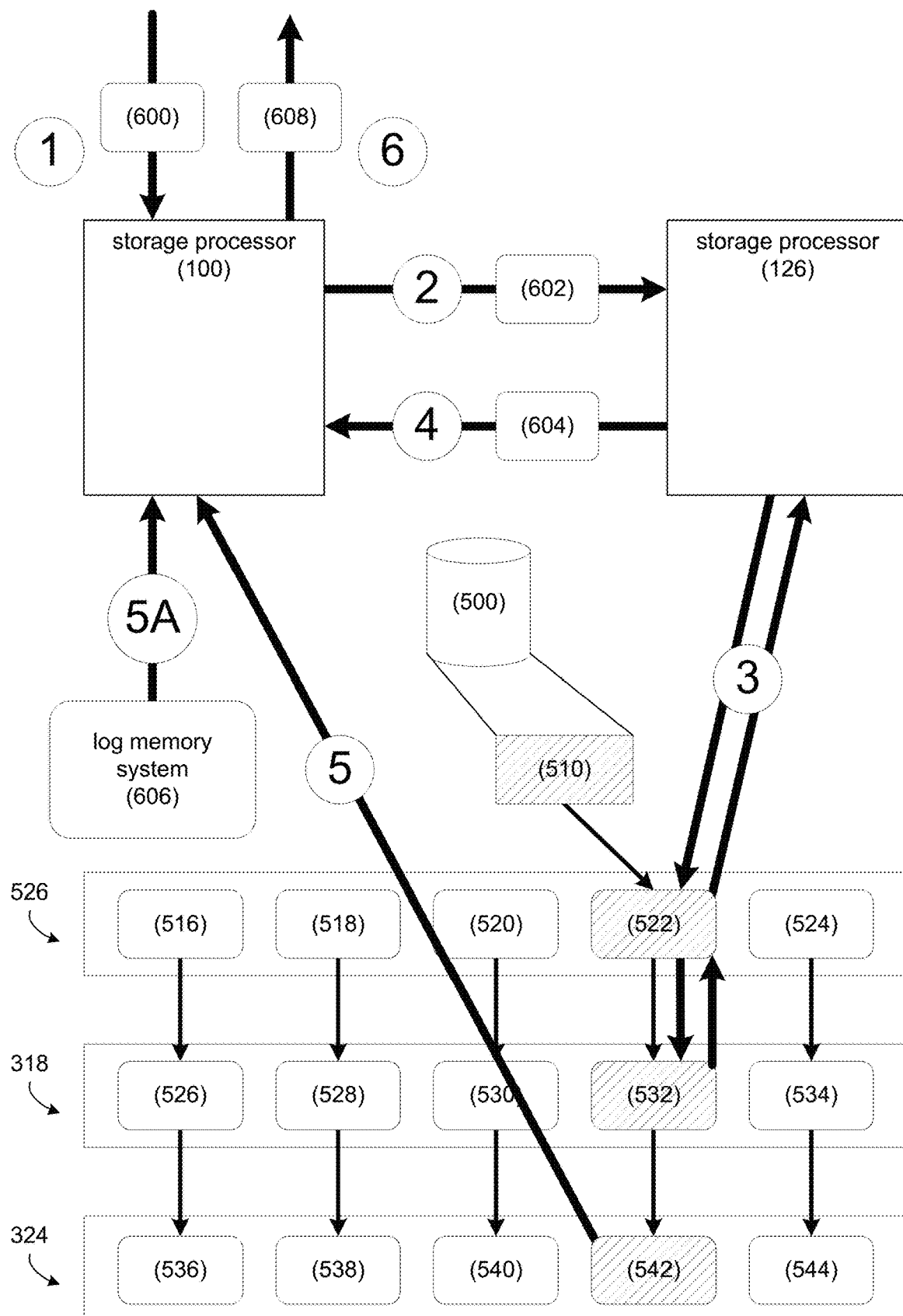
FIGS. 6-8 are example diagrammatic views of the data ownership process of FIG. 1 according to one or more example implementations of the disclosure.

In some implementations, processing 412 the IO request on the exclusive ownership storage node associated with the data portion may include processing an IO read request, wherein processing the IO read request includes: receiving 414 the IO read request on the first storage node; determining 416 that the exclusive ownership storage node associated with the data portion is a second storage node; sending 418 a request to the second storage node to map the data portion to a virtual layer block; receiving 420 a response from the second storage node with a virtual layer block address; and reading 422 the data portion using the first storage node from a physical layer block associated with the virtual layer block address. Referring also to FIG. 6 and in some implementations, suppose data ownership process 10 receives 414 an IO read request (e.g., IO read request 600) from a host at storage node 100. In this example, IO read request 600 may include a reference to a particular data portion (e.g., data portion 510) of a specific storage object (e.g., storage object 500). Receiving 414 IO read request 600 is shown in FIG. 6 as action "1". Data ownership process 10 may determine 416 that the exclusive ownership storage node associated with data portion 510 is storage node 126. For example, data ownership process 10 may search a listing of data portions and/or perform a calculation to determine which storage node is assigned exclusive ownership over data portion 510. In this example, data portion 510 may be an evenly addressed data portion that is assigned, along with all other evenly addressed data portions, to storage node 126.

In response to determining that storage node 126 is the exclusive ownership storage node for data portion 510, data ownership process 10 may send 418 a request to storage node 126 to map data portion to a virtual layer block that is accessible to storage node 100. In some implementations, data ownership process 10 may send a remote procedure call (RPC) request (e.g., RPC 602) from storage node 100 to storage node 126. As is known in the art, an RPC is when a computer program causes a procedure to execute in a different address space (i.e., on another storage node), which is coded as if it were a normal procedure call, without the programmer explicitly coding the details for the remote interaction. By using RPC requests, data ownership process 10 does not transmit the data portion (e.g., data portion 510) between the storage nodes. Rather, storage node 100 is requesting that storage node 126 identify the location of the virtual layer block within the virtual layer block layer. This is represented in FIG. 6 as action "2".

In response to receiving the request at storage node 126, data ownership process 10 may, using storage node 126, map data portion 510 to virtual layer block 532 to determine the address for virtual layer block 532. This is represented in FIG. 6 as action "3" with one set of arrows from storage node 126 to virtual layer block 532 and a second set of arrows returning the virtual layer block address to storage node 126. Data ownership process 10 may receive 420 a response from the second storage node with a virtual layer block address. For example, storage node 126 may send virtual layer block address 604 as a response to RPC 602. This is shown in FIG. 6 as action "4". With virtual layer block address 604 obtained from storage node 126, storage node 100 may read 422 the data portion from a physical layer block associated with the virtual layer block address. For example, virtual layer block address 604 may reference virtual layer block 532. Storage node 100 may read physical layer block 542 associated with virtual layer block 532 that includes the data from data portion 510. This is shown in FIG. 6 as action "5". In one example, data ownership process 10 may determine that the data of data portion 510 is stored in a log memory system (e.g., log memory system 606). For example, log memory system 606 may be configured to log user data written to the storage cluster. Log memory system 606 may be accessible to both storage nodes and/or may be specific to storage node 100 with a corresponding, mirrored log memory system on storage node 126. Accordingly, data ownership process 10 may read data portion 510 from log memory system 606 instead of from a physical layer block (e.g., physical layer block 542). In response to reading 422 data portion 510 from physical layer block 542 or log memory system 606, data ownership process 10 may return IO request 600 with content (e.g., content 608).

Figure 7:
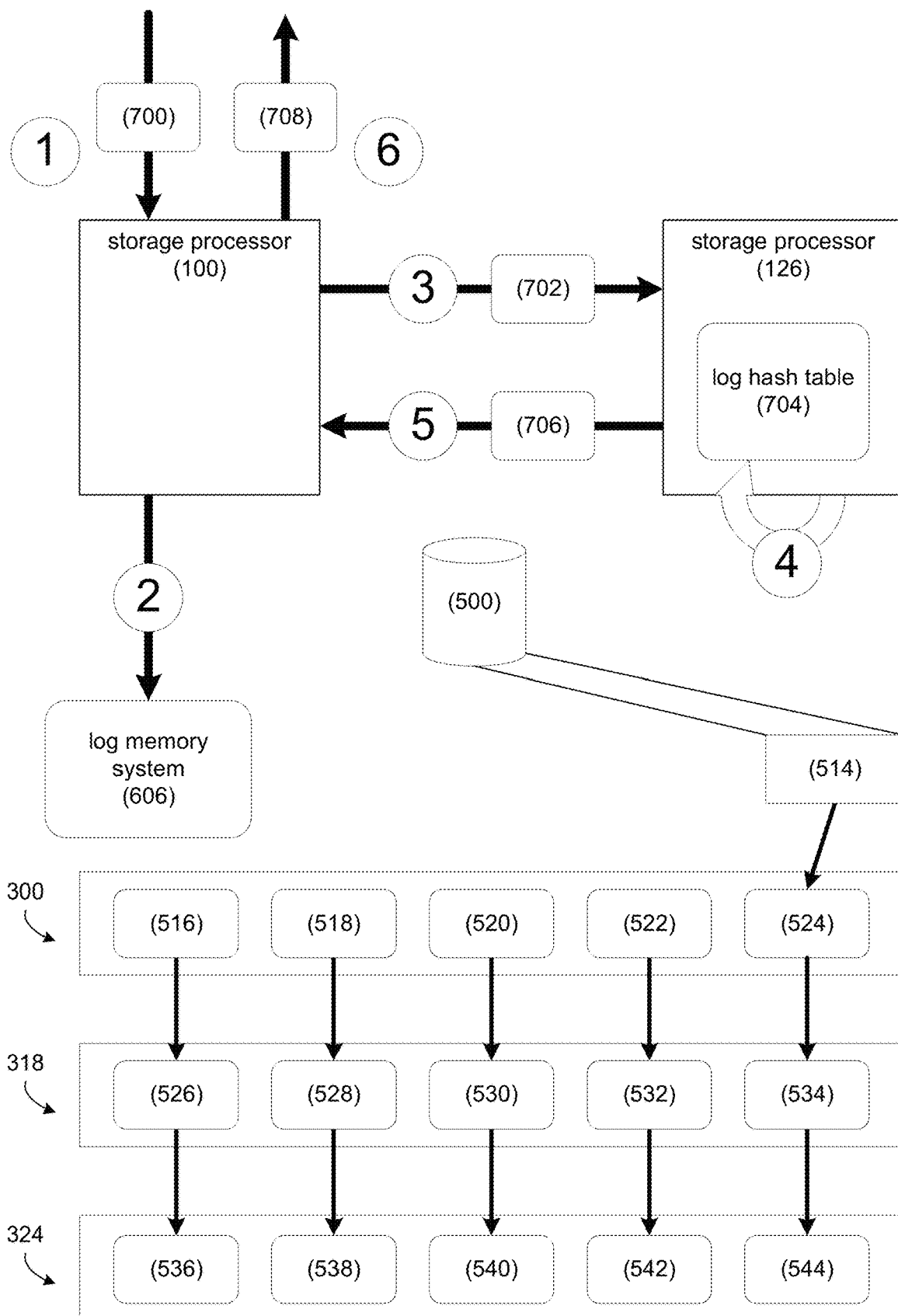

In some implementations, processing 412 the IO request on the exclusive ownership storage node associated with the data portion may include processing an IO write request, wherein processing the IO write request includes: receiving 424 the IO write request on the first storage node; determining 426 that the exclusive owner node associated with the data portion is a second storage node; writing 428 content for the data portion to a log memory system; sending 430 a request to the second storage node with information concerning the IO write request; receiving 432 a response from the second storage node acknowledging the IO write request; and sending 434 an acknowledgement signal from the first storage node. Referring also to FIG. 7 and in some implementations, suppose data ownership process 10 receives 424 an IO write request (e.g., IO write request 700) at storage node 100. In this example, IO write request 700 may include a reference to write content to a particular data portion (e.g., data portion 514) of a specific storage object (e.g., storage object 500). Receiving 424 IO read request 700 is shown in FIG. 7 as action "1". Data ownership process 10 may determine 426 that the exclusive ownership storage node associated with data portion 514 is storage node 126. For example, data ownership process 10 may search a listing of data portions and/or perform a calculation to determine which storage node is assigned exclusive ownership over data portion 514. In this example, data portion 514 may be an evenly addressed data portion that is assigned, along with all other evenly addressed data portions, to storage node 126.

In response to determining that storage node 126 is the exclusive ownership storage node for data portion 514, data ownership process 10 may write 428 content from IO write request 700 for the data portion to a log memory system (e.g., log memory system 606). This is shown in FIG. 7 as action "2". In response to writing 428 the content for data portion 514 to log memory system 606, data ownership process 10 may send 430 a request to the second storage node with information concerning the IO write request. In some implementations, data ownership process 10 may send a remote procedure call (RPC) request (e.g., RPC 702) from storage node 100 to storage node 126. For example, RPC request 702 may include information concerning the IO write request associated with data portion 514 that is owned by storage node 126. In some implementations, the information may describe the location of the data portion within log memory system 606. This is represented in FIG. 7 as action "3".

In response to receiving RPC request 702, storage node 126 may update a log hash table (e.g., log hash table 704) on storage node 126 with the information concerning the IO write request. For example, data ownership process 10 may update log hash table 704 with the location of the content for data portion 514 (i.e., the content written for data portion 514) within log memory system 606. This is shown in FIG. 7 as action "4". As storage node 126 is assigned exclusive ownership over data portion 514, storage node 126 may use this information to process content for data portion 514 from log memory system 606.

In some implementations, data ownership process 10 may receive 432 a response from the second storage node acknowledging the IO write request. For example, in response to processing RPC request 702 on storage node 126, storage node 126 may send a response (e.g., response 706) acknowledging the IO write request 700 to storage node 100. This is shown in FIG. 7 as action "5". With response 706 from storage node 126, storage node 100 may send 434 an acknowledgement signal (e.g., acknowledgement signal 708) to the host that initially sent IO request 700. This is shown in FIG. 7 as action "6".

Figure 8:
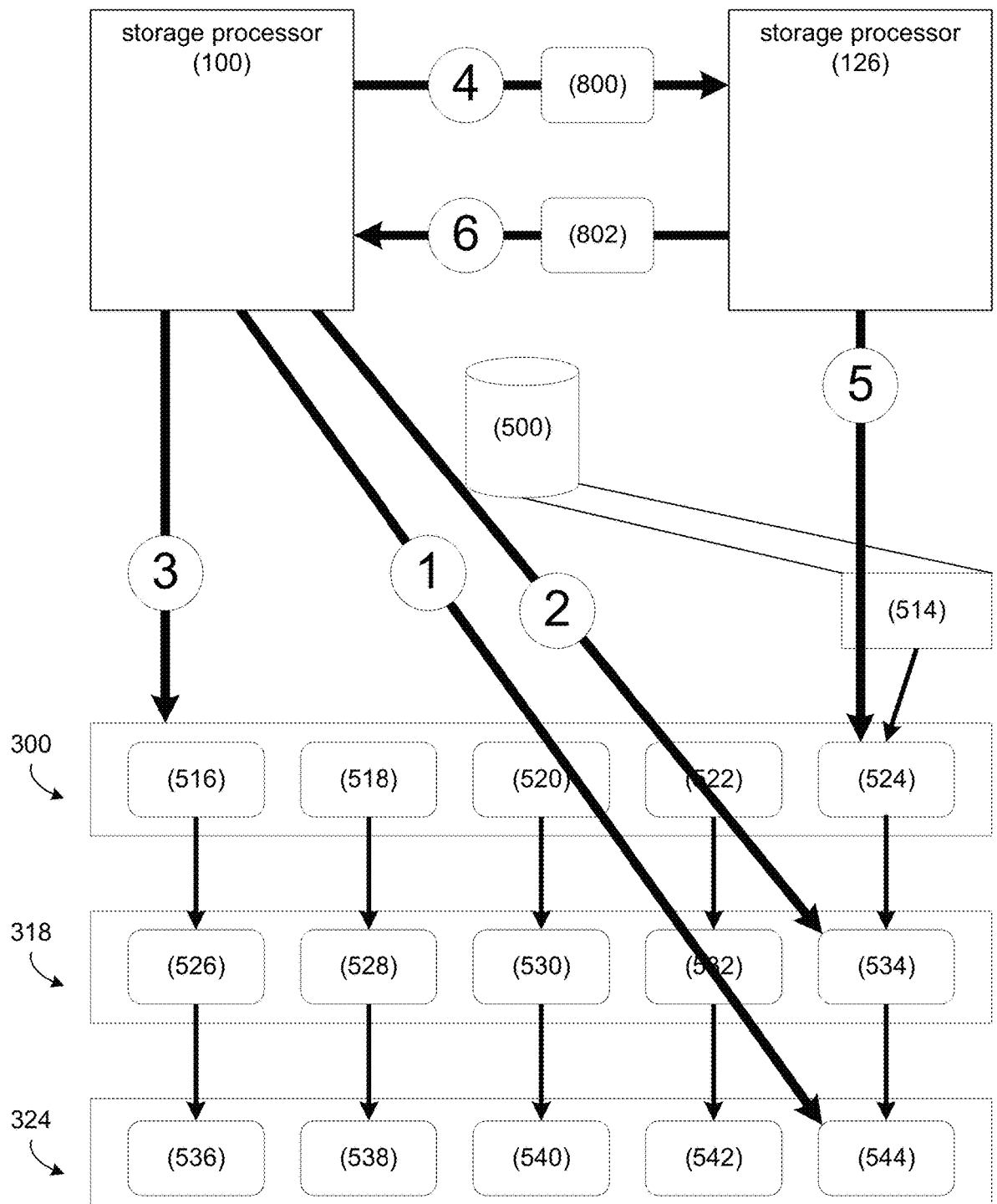

In some implementations, processing 412 the IO request on the exclusive ownership storage node associated with the data portion may include flushing the data portion, wherein flushing the data portion includes: writing 436, from the first storage node, the data portion to a physical layer block; generating 438 a virtual layer block corresponding to the physical layer block; updating 440 a mapper metadata tree with information concerning the flushing of the data portion; sending 442 a request to the second storage node with information concerning the flushing of the data portion; and receiving 444 a response from a second storage node acknowledging the flushing of the data portion. In some implementations, data ownership process 10 may perform various internal or background operations using each storage node of the storage cluster. For example, data ownership process 10 may perform a flushing operation to flush data from a storage node to backend storage (e.g., storage array 112). Referring also to FIG. 8, suppose data ownership process 10 flushes a data portion from the first storage node by writing 436 the data portion (e.g., data portion 514) to a physical layer block (e.g., physical layer block 544). The physical layer block may be a partially utilized physical layer block or an empty physical layer block. This is shown in FIG. 8 as action "1".

In response to writing 436 data portion 514 to physical layer block 544, data ownership process 10 may generate 438 a virtual layer block (e.g., virtual layer block 534) corresponding to physical layer block 544. This is shown in FIG. 8 as action "2". In response to generating 438 virtual layer block 534, data ownership process 10 may update 440 a mapper metadata tree with information concerning the flushing of the data portion. For example, storage node 100 may update its mapper metadata tree with information concerning the flushing of data portion 514 to physical layer block 544. This is shown in FIG. 8 as action "3".

In some implementations, data ownership process 10 may send 442 a request (e.g., RPC request 800) to storage node 126 with information concerning the flushing of data portion 514. This is shown in FIG. 8 as action "4". In response to sending 442 request 800 to storage node 126, storage node 126 may process request 800 and update its mapper metadata tree with information concerning the flushing of data portion 514. This is shown in FIG. 8 as action "5". Data ownership process 10 may then receive, at storage node 100, a response (e.g., RPC response 802) from storage node 126 indicating that storage node 126 acknowledges the flushing of data portion 514. This is shown in FIG. 8 as action "6".

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
    dividing a logical address space into a first set of data portions and at least a second set of data portions;
    assigning exclusive ownership of the first set of data portions to a first storage node of a storage cluster;
    assigning exclusive ownership of the at least a second set of data portions to at least a second storage node of the storage cluster; and
    processing one or more IO requests associated with one or more of the first set of data portions and the at least a second set of data portions without transferring data portions between the first storage node and the at least a second storage node based upon, at least in part, the exclusive ownership of the first set of data portions by the first storage node and the exclusive ownership of the at least a second set of data portions by the at least a second storage node, wherein processing the one or more IO requests associated with one or more of the first set of data portions and the at least a second set of data portions includes:
        determining an exclusive ownership storage node associated with the one or more IO requests; and
        processing the IO request on the exclusive ownership storage node associated with the data portion without transferring data portions between the exclusive ownership storage node and the other storage nodes, wherein processing the IO request on the exclusive ownership storage node associated with the data portion includes processing an IO read request, wherein processing the IO read request includes:
            receiving the IO read request on the first storage node;
            determining that the exclusive ownership storage node associated with the data portion is a second storage node;
            sending a request to the second storage node to map the data portion to a virtual layer block, wherein the data portion is mapped to the virtual layer block in response to the request from the first storage node;
            receiving a response from the second storage node with a virtual layer block address; and
            reading the data portion using the first storage node from a physical layer block associated with the virtual layer block address.

2. The computer-implemented method of claim 1, further comprising:
    assigning non-exclusive ownership of one or more metadata objects associated with the first set of data portions and the at least a second set of data portions based upon, at least in part, a type of IO request of the one or more IO requests.

3. The computer-implemented method of claim 2, wherein the one or more metadata objects associated with the first set of data portions and the at least a second set of data portions include one or more mapper metadata tree objects and one or more virtual layer blocks.

4. The computer implemented method of claim 1, wherein processing the IO request on the exclusive ownership storage node associated with the data portion includes processing an IO write request, wherein processing the IO write request includes:
    receiving the IO write request on the first storage node;
    determining that the exclusive owner node associated with the data portion is a second storage node;
    writing content for the data portion to a log memory system;
    sending a request to the second storage node with information concerning the IO write request;
    receiving a response from the second storage node acknowledging the IO write request; and
    sending an acknowledgement signal from the first storage node.

5. The computer implemented method of claim 1, wherein processing the IO request on the exclusive ownership storage node associated with the data portion includes flushing the data portion, wherein flushing the data portion includes:
    writing, from the first storage node, the data portion to a physical layer block;
    generating a virtual layer block corresponding to the physical layer block;
    updating a mapper metadata tree with information concerning the flushing of the data portion;
    sending a request to a second storage node with information concerning the flushing of the data portion; and
    receiving a response from the second storage node acknowledging the flushing of the data portion.

6. A computer program product residing on a non-transitory computer readable medium having a plurality of instructions stored thereon which, when executed by a processor, cause the processor to perform operations comprising:
    dividing a logical address space into a first set of data portions and at least a second set of data portions;
    assigning exclusive ownership of the first set of data portions to a first storage node of a storage cluster;
    assigning exclusive ownership of the at least a second set of data portions to at least a second storage node of the storage cluster; and
    processing one or more IO requests associated with one or more of the first set of data portions and the at least a second set of data portions without transferring data portions between the first storage node and the at least a second storage node based upon, at least in part, the exclusive ownership of the first set of data portions by the first storage node and the exclusive ownership of the at least a second set of data portions by the at least a second storage node, wherein processing the one or more IO requests associated with one or more of the first set of data portions and the at least a second set of data portions includes:
determining an exclusive ownership storage node associated with the one or more IO requests; and
processing the IO request on the exclusive ownership storage node associated with the data portion without transferring data portions between the exclusive ownership storage node and the other storage nodes, wherein processing the IO request on the exclusive ownership storage node associated with the data portion includes processing an IO read request, wherein processing the IO read request includes:
receiving the IO read request on the first storage node;
determining that the exclusive ownership storage node associated with the data portion is a second storage node;
sending a request to the second storage node to map the data portion to a virtual layer block, wherein the data portion is mapped to the virtual layer block in response to the request from the first storage node;
receiving a response from the second storage node with a virtual layer block address; and
reading the data portion using the first storage node from a physical layer block associated with the virtual layer block address.

7. The computer program product of claim 6, wherein the operations further comprise:
assigning non-exclusive ownership of one or more metadata objects associated with the first set of data portions and the at least a second set of data portions based upon, at least in part, a type of IO request of the one or more IO requests.

8. The computer program product of claim 7, wherein the one or more metadata objects associated with the first set of data portions and the at least a second set of data portions include one or more mapper metadata tree objects and one or more virtual layer blocks.

9. The computer program product of claim 6, wherein processing the IO request on the exclusive ownership storage node associated with the data portion includes processing an IO write request, wherein processing the IO write request includes:
receiving the IO write request on the first storage node;
determining that the exclusive owner node associated with the data portion is a second storage node;
writing content for the data portion to a log memory system;
sending a request to the second storage node with information concerning the IO write request;
receiving a response from the second storage node acknowledging the IO write request; and
sending an acknowledgement signal from the first storage node.

10. The computer program product of claim 6, wherein processing the IO request on the exclusive ownership storage node associated with the data portion includes flushing the data portion, wherein flushing the data portion includes:
writing, from the first storage node, the data portion to a physical layer block;
generating a virtual layer block corresponding to the physical layer block;
updating a mapper metadata tree with information concerning the flushing of the data portion;
sending a request to a second storage node with information concerning the flushing of the data portion; and
receiving a response from the second storage node acknowledging the flushing of the data portion.

11. A computing system comprising:
a memory; and
a processor configured to divide a logical address space into a first set of data portions and at least a second set of data portions, wherein the processor is further configured to assign exclusive ownership of the first set of data portions to a first storage node of a storage cluster, wherein the processor is further configured to assign exclusive ownership of the at least a second set of data portions to at least a second storage node of the storage cluster, and wherein the processor is further configured to process one or more IO requests associated with one or more of the first set of data portions and the at least a second set of data portions without transferring data portions between the first storage node and the at least a second storage node based upon, at least in part, the exclusive ownership of the first set of data portions by the first storage node and the exclusive ownership of the at least second set of data portions by the at least a second storage node, wherein processing the one or more IO requests associated with one or more of the first set of data portions and the at least a second set of data portions includes: determining an exclusive ownership storage node associated with the one or more IO requests; and processing the IO request on the exclusive ownership storage node associated with the data portion without transferring data portions between the exclusive ownership storage node and the other storage nodes, wherein processing the IO request on the exclusive ownership storage node associated with the data portion includes processing an IO read request, wherein processing the IO read request includes: receiving the IO read request on the first storage node; determining that the exclusive ownership storage node associated with the data portion is a second storage node; sending a request to the second storage node to map the data portion to a virtual layer block, wherein the data portion is mapped to the virtual layer block in response to the request from the first storage node; receiving a response from the second storage node with a virtual layer block address; and reading the data portion using the first storage node from a physical layer block associated with the virtual layer block address.

12. The computing system of claim 11, wherein the processor is further configured to:
assign non-exclusive ownership of one or more metadata objects associated with the first set of data portions and the at least a second set of data portions based upon, at least in part, a type of IO request of the one or more IO requests.

13. The computing system of claim 12, wherein the one or more metadata objects associated with the first set of data portions and the at least a second set of data portions include one or more mapper metadata tree objects and one or more virtual layer blocks.

14. The computing system of claim 11, wherein processing the IO request on the exclusive ownership storage node associated with the data portion includes processing an IO write request, wherein processing the IO write request includes:
- receiving the IO write request on the first storage node;
- determining that the exclusive owner node associated with the data portion is a second storage node;
- writing content for the data portion to a log memory system;
- sending a request to the second storage node with information concerning the IO write request;
- receiving a response from the second storage node acknowledging the IO write request; and
- sending an acknowledgement signal from the first storage node.

* * * * *